(12) United States Patent
Harris et al.

(10) Patent No.: US 8,954,981 B2
(45) Date of Patent: *Feb. 10, 2015

(54) METHOD FOR RESOURCE OPTIMIZATION FOR PARALLEL DATA INTEGRATION

(75) Inventors: Simon David Harris, Warwickshire (GB); Xiaoyan Pu, Westborough, MA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/405,160

(22) Filed: Feb. 24, 2012

(65) Prior Publication Data

US 2012/0167112 A1    Jun. 28, 2012

Related U.S. Application Data

(63) Continuation of application No. 12/554,867, filed on Sep. 4, 2009.

(51) Int. Cl.
*G06F 15/173* (2006.01)
*G06F 9/46* (2006.01)
*G06F 9/50* (2006.01)

(52) U.S. Cl.
CPC ........ *G06F 9/5072* (2013.01); *G06F 2209/508* (2013.01); *G06F 2209/5019* (2013.01)
USPC .......................................... 718/104; 709/226

(58) Field of Classification Search
None
See application file for complete search history.

(56) References Cited

U.S. PATENT DOCUMENTS

| | | | |
|---|---|---|---|
| 6,049,861 A | 4/2000 | Bird | |
| 6,086,618 A * | 7/2000 | Al-Hilali et al. | 703/2 |
| 6,205,441 B1 | 3/2001 | Al-omari | |
| 6,389,587 B1 | 5/2002 | Lewis | |
| 6,564,221 B1 | 5/2003 | Shatdal | |
| 6,832,248 B1 | 12/2004 | Byrnes | |
| 6,889,221 B1 | 5/2005 | Luo | |
| 7,065,764 B1 * | 6/2006 | Prael et al. | 718/102 |
| 7,082,606 B2 | 7/2006 | Wood | |
| 7,127,701 B2 | 10/2006 | Fables | |

(Continued)

FOREIGN PATENT DOCUMENTS

EP    1275222 A2    1/2003
EP    1275222 B1    10/2011

OTHER PUBLICATIONS

Sep. 21, 2009_NoticeofAllowance.

(Continued)

*Primary Examiner* — Lewis A Bullock, Jr.
*Assistant Examiner* — Kevin X Lu
(74) *Attorney, Agent, or Firm* — Anthony V. S. England; Mohammed Koshet; Susan Murray

(57) ABSTRACT

For optimizing resources for a parallel data integration job, a job request is received, which specifies a parallel data integration job to deploy in a grid. Grid resource utilizations are predicted for hypothetical runs of the specified job on respective hypothetical grid resource configurations. This includes automatically predicting grid resource utilizations by a resource optimizer module responsive to a model based on a plurality of actual runs of previous jobs. A grid resource configuration is selected for running the parallel data integration job, which includes the optimizer module automatically selecting a grid resource configuration responsive to the predicted grid resource utilizations and an optimization criterion.

8 Claims, 10 Drawing Sheets

(56) References Cited

U.S. PATENT DOCUMENTS

| | | | |
|---|---|---|---|
| 7,152,157 | B2 | 12/2006 | Murphy et al. |
| 7,174,379 | B2 | 2/2007 | Agarwal |
| 7,266,807 | B2 | 9/2007 | Takano |
| 7,426,570 | B2 | 9/2008 | Andrzejak |
| 7,444,638 | B1 * | 10/2008 | Xu ................. 718/104 |
| 7,467,180 | B2 | 12/2008 | Kaufman |
| 7,480,734 | B1 | 1/2009 | Thakur |
| 7,543,006 | B2 | 6/2009 | Brown |
| 7,660,884 | B2 | 2/2010 | Pu |
| 7,861,246 | B2 | 12/2010 | Lu |
| 8,001,510 | B1 * | 8/2011 | Miller et al. ............ 716/116 |
| 8,108,512 | B2 | 1/2012 | Howard |
| 8,281,012 | B2 | 10/2012 | Pu |
| 2002/0059202 | A1 | 5/2002 | Hadzikadic |
| 2002/0095525 | A1 | 7/2002 | Fables |
| 2003/0028642 | A1 | 2/2003 | Agarwal |
| 2003/0065671 | A1 | 4/2003 | Cardenas |
| 2005/0125537 | A1 | 6/2005 | Martins |
| 2005/0283782 | A1 | 12/2005 | Lu |
| 2006/0048157 | A1 | 3/2006 | Dawson |
| 2006/0069717 | A1 | 3/2006 | Mamou |
| 2006/0075399 | A1 * | 4/2006 | Loh et al. .............. 717/174 |
| 2006/0150159 | A1 | 7/2006 | Fellenstein |
| 2006/0167966 | A1 | 7/2006 | Kumar |
| 2006/0206898 | A1 * | 9/2006 | Miner et al. ............ 718/104 |
| 2006/0259621 | A1 | 11/2006 | Ranganathan |
| 2007/0078960 | A1 | 4/2007 | Dawson |
| 2007/0101000 | A1 | 5/2007 | Childress |
| 2007/0174290 | A1 | 7/2007 | Narang |
| 2008/0082933 | A1 | 4/2008 | Howard |
| 2008/0114870 | A1 | 5/2008 | Pu |
| 2008/0256397 | A1 | 10/2008 | Smith |
| 2008/0256531 | A1 * | 10/2008 | Gao et al. .............. 717/177 |
| 2008/0306798 | A1 * | 12/2008 | Anke et al. ............... 705/8 |
| 2008/0313643 | A1 * | 12/2008 | Longobardi .............. 718/104 |
| 2009/0012983 | A1 | 1/2009 | Senneville |
| 2009/0064165 | A1 | 3/2009 | Arimilli |
| 2009/0076988 | A1 * | 3/2009 | Stanelle ................. 706/12 |
| 2009/0193427 | A1 | 7/2009 | Pu |

OTHER PUBLICATIONS

May 11, 2011__Nonfinal Rejection.
Oct. 11, 2011__Fiinal Rejection.
Jan. 13, 2012__NoticeofAllowance.
May 25, 2012__NoticeofAllowance.
Jul. 20, 2012__Nonfinal Rejection.
Mar. 25, 2013__FinalRejection.
Abramson, David, Nimrod/K: Towards Massively Parallel Dynamic Grid Workflows, IEEE SC2008, Nov. 2008, Austin, TX, 978-1-4244-2835-9/08.
Madden, Samuel, The Design of an Acquisitional Query Processor for Sensor Networks, SIGMOD 2003, Jun. 9-12, San Diego, CA, ACM 1-58113-634-7/03/06.
Zinn, Daniel, Modeling and Optimization of Scientific Workflows, EDBT 2008 PhD. Workshop '08, Mar. 25, 2008, Nantes, France, ACM 978-1-59593-968-5/08/03.
Duan, Rubing, Run-time Optimisation of Grid Workflow Applications, IEEE Grid Computing Conference 2006, 1-4244-0344-8/06.
Ding, Zhaohui, et al., "Customized Plug-in Modules in Metascheduler Community Scheduler Framework 4 (CSF4) for Life Sciences Application", 14 Pages.
Coveney, P.V., et al., "The Application Hosting Environment: Lightweight Middleware for Grid-Based Computational Science", arXiv:Physics0609168 vl., Sep. 20, 2006, 29 Pages.
Pu, Xiaoyan, et al., "IBM information Server Blade—Deep Dive", IBM information on Demand 2007, Oct. 14-19, 2007, 31 pages.
Adve, et al., "Parallel Program Performance Prediction Using Deterministic Task Graph Analysis," (Feb. 2004) ACM Transactions on Comp Sys. vol. 22, No. 1, pp. 94-136.
Ahituv, et al, "A Model for Predicting and Evaluating Computer Resource Consumption," (Dec. 1988) Communications of the ACM, vol. 31. No. 12., pp. 1467-1473.
Juhasz, Sandor et al., "Execution Time Prediction for Parallel Data Processing Tasks," (2002) IEEE, $10^{th}$ Euromicro Workshop on Parallel, Distributed & Network-based Processing (EUROMICRO-PDP '02), 8 pp.
Levine, et al., "A resource Estimation and Call Admission Algorithm for Wireless multimedia Networks Using the Shadow Cluster Concepts," (Feb. 1997) IEEE/ACM Trans on Networking, vol. 5, No. 1, pp. 1-12.
Milder, et al., "Fast and Accurate Resource Estimation of Automatically Generated Custom DFT IP Cores," (Feb. 2006) Monterey, CA, US, FPGA '06, pp. 211-220.
Qiu, et al., "A Predictive Flow Control scheme for Efficient Network Utilization and QoS," (Feb. 2004) IEEE/ACM Trans on Networking, vol. 12, No. 1, pp. 11-172.
Thornton, et al., "Resource Estimation for Parallel Architectures with Distributed processor/Memory Nodes," (1998) Journal of computing and Info Technology, CIT 6, pp. 359-371.
Yang, et al., "Cross-Platform Performance Prediction of Parallel Applications Using Partial Execution," (Nov. 2005) IEEE/ACM, SC05, Conf/Nov. 12-18, 2005, Seattle, WA, US, 11 pp.

* cited by examiner

METHOD FOR RESOURCE OPTIMIZATION FOR PARALLEL DATA INTEGRATION

CROSS REFERENCE TO RELATED APPLICATION

This is a continuation of, and hereby claims the benefit of the priority date of, application Ser. No. 12/554,867, which was filed Sep. 4, 2009.

CROSS-REFERENCE TO RELATED APPLICATIONS

This application is related to the following applications, which are owned in common with the present application and are hereby incorporated herein by reference:

X. Pu, "Apparatus, System and Method for Generating a Resource Utilization Description for a Parallel Data Processing System," United States Published Patent Application 2008/0114870, filed Nov. 10, 2006; and X. Pu and C. Thornton, "Managing Parallel Data Processing Jobs in Grid Environments," United States Published Patent Application 2009/0193427, filed Jan. 30, 2008.

BACKGROUND

The present invention relates to job design for parallel data integration, and more particularly to automatic and dynamic creation of configurations for parallel data integration jobs.

Data integration in a parallel computing environment typically involves computations with large data sets, which may even exceed thousands of Gigabytes, distributed among computers or partitions. (Partitions may correspond to the computers in some instances and may exist as computer subdivisions in other instances.) This, of course, consumes both processing and storage resources.

Regarding the storage resources, the data sets include i) one or more originating data sets (also known as "data sources"), which consume disk space that may be associated with respective originating computers, and ii) one or more destination data sets (also known as "data sinks"), which consume computer disk space that may be associated with respective destination computers. Such data sets are for long term storage, which may be referred to as "permanent" storage.

In addition to consuming long term storage for originating and destination storage data sets, data integration requires temporary storage. That is, during a time while data sets are processed, some operations require memory, e.g., disk space, to store intermediate results. (This memory to store intermediate results of processing operations may be called "scratch space" or "intermediate memory.") For example, a sorting operation may require memory for storing intermediate results during the time the sort is executing.

In a parallel computing environment, various operations on data sets can be performed across different computers and the operational steps for processing the data sets can be intertwined and complicated. Processing steps, i.e., data processing flow, to be performed on one or more data sets may be described by a "data flow graph" (also referred to, more simply, as a "data graph"), which may be a pictorial or string representation of relationships among operations in the data processing flow. A data graph describes data sources, operations to be performed and data sinks. The data flow graph may be coupled with other information—for example, a configuration file describing which operations are performed on which partitions and a data schema for each operator at the input and output for the given operator.

Based on the above, it should be appreciated that resource utilization may include data source and sink storage space, scratch space, and processor utilization.

SUMMARY OF THE INVENTION

Methods of optimizing resources for a parallel data integration job are provided, along with systems and computer program products therefor. In one implementation, a job request is received, which specifies a parallel data integration job to deploy in a grid. Grid resource utilizations are predicted for hypothetical runs of the specified job on respective hypothetical grid resource configurations. This includes automatically predicting grid resource utilizations by a resource optimizer module responsive to a model based on a plurality of actual runs of previous jobs. A grid resource configuration is selected for running the parallel data integration job, which includes the optimizer module automatically selecting a grid resource configuration responsive to the predicted grid resource utilizations and an optimization criterion.

In another aspect, resource utilization categories are generated, including the optimizer module automatically generating resource utilization categories responsive to the predicted grid resource utilizations, wherein the optimizer module automatically selecting the grid resource configuration responsive to the optimization criterion includes selecting the grid resource configuration responsive to the categories.

In another aspect, the job request includes operators specifying parallel data integration operations performed when the parallel data integration job is run. The optimizer module automatically generating resource utilization categories responsive to the predicted grid resource utilizations includes generating resource utilization indices for the respective operators responsive to the predicted grid resource utilizations; generating resource utilization indices for respective groups of the operators responsive to the resource utilization indices of the respective operator groups; and generating a first resource utilization index for the job responsive to the resource utilization indices of the respective operator groups.

In another aspect, a second resource utilization index for the job is generated, wherein generating the second resource utilization index includes selecting a first maximum of the resource utilization indices for a first subset of the operator groups; selecting a second maximum of the resource utilization indices for a second subset of the operator groups; and computing a ratio of the first and second maxima.

In another aspect, a third resource utilization index is generated for the job responsive to a sum of the predicted grid resource utilizations for all the operators.

In another aspect, correlation coefficients are generated for the model responsive to performance data for a plurality of previous jobs actually run on respective configurations of the grid resources.

In another aspect, selecting the grid resource configuration for running the parallel data integration job includes selecting an optimal number of physical compute nodes.

In another aspect, selecting the grid resource configuration for running the parallel data integration job includes adjusting estimated resource utilizations for operators responsive to a ratio of user-specified job execution time to estimated job execution time; and selecting a number of partitions for each operator responsive to a combined total of adjusted estimated resource utilizations on all the operator's partitions and a minimum of the adjusted estimated resource utilizations among all the operator's partitions.

In another aspect, the job request includes a data graph of linked operators specifying a sequence of parallel data integration operations performed when the parallel data integration job is run, such that each operator has one or more respective link mates. Selecting the grid resource configuration for running the parallel data integration job includes traversing the data graph and increasing numbers of partitions for operators having throughputs less than their respective link mates.

In another aspect, selecting the grid resource configuration for running the parallel data integration job includes selecting a number of partitions for each physical node responsive to the categories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
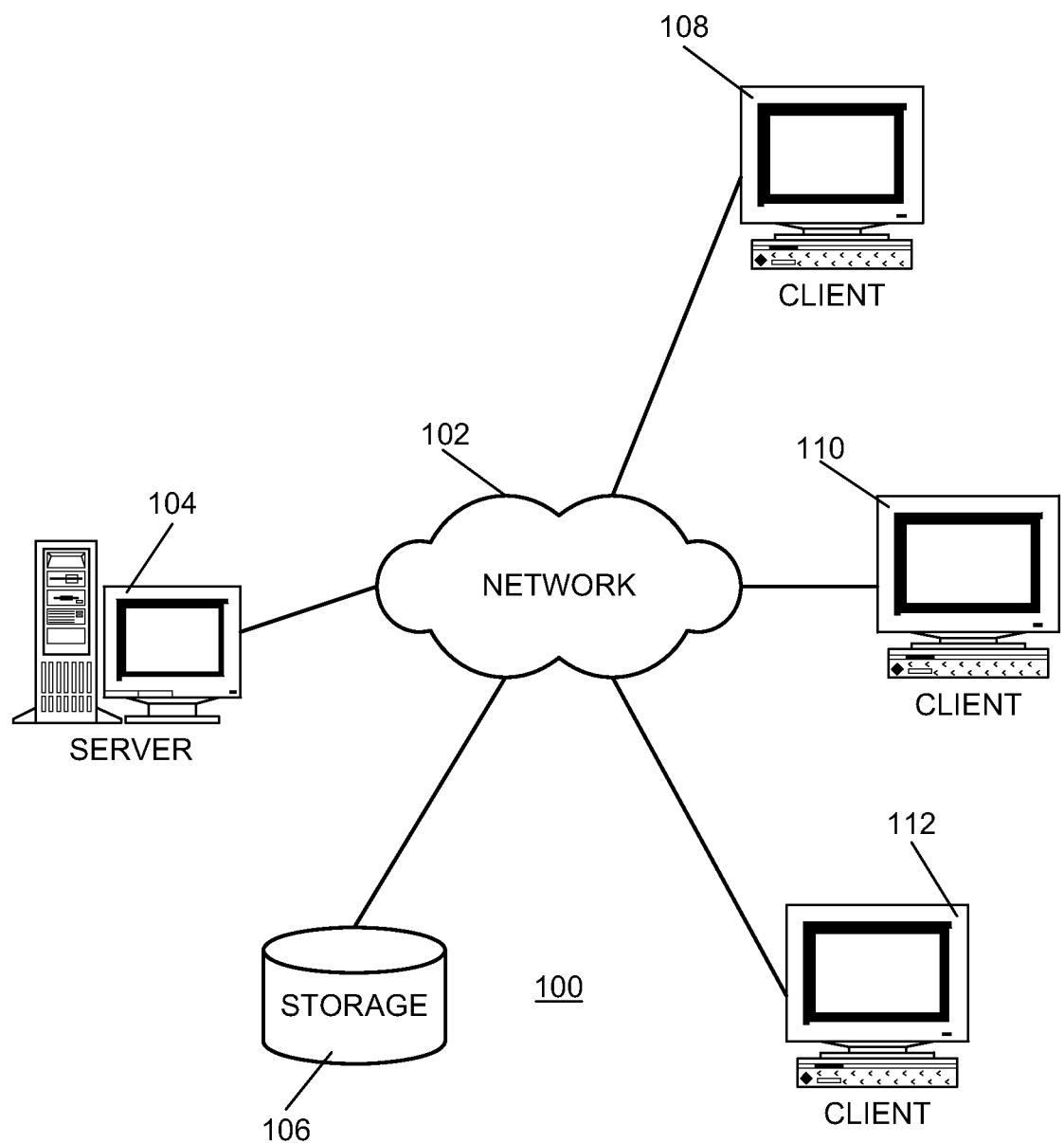
FIG. 1 is an exemplary block diagram illustrating a distributed data processing system according to an embodiment of the invention.

Headings herein are not intended to limit the invention, embodiments of the invention or other matter disclosed under the headings.

Predicting and optimizing resource utilization for a data processing job is important in designing the job and in designing hardware or planning for upgrades to hardware. Herein described are advances, including advances in automation with regard to dynamic creation of configuration files for parallel data integration jobs, resulting in more nearly optimal job configurations, which tend to improve execution and more closely match job configurations to job resource requirements.

U.S. Patent Publication 2008/0114870 A1 describes how to estimate and predict job resource utilization based on data flow and input data, and encompasses a resource estimation tool used at job design time. The tool allows a user to find a more nearly optimal data flow for data transformation logic, such as, for example, logic to merge multiple data streams into one. In one such application of the tool, a user designs three alternative jobs that merge multiple data streams, where the alternative jobs use join, merge, or lookup operators, respectively. The user directs the resource estimation tool to automatically estimate resource utilization (such as CPU, disk usage, scratch usage) for each job and compare the estimated results in order to find a more nearly optimal design, which depends upon the entire transformation logic of the job as well as the volume of input data, among other things. Once a job design has been finalized, if different input data arises the user can direct the tool to predict resource utilization, which is helpful for migrating a job among environments including development, test and production. This is particularly advantageous, because data volume may change greatly from one environment to another. Application of the tool can predict how much CPU processing, disk memory and scratch memory a job needs.

U.S. Patent application 2009/0193427 describes how to manage parallel data processing jobs in grid environments, which includes when and where to run each job. In one feature, the patent application discloses automatically generating a dynamic parallel configuration file responsive to a user specified criteria and available system resources. This is in contrast to past practices in which users manually creating parallel configuration files and attempting to leverage user effort merely by multiple users cooperatively storing such manually created files and sharing them with one another.

In the past, configuration files had to be manually created due to a variety of circumstances. For example, different environments may have different system characteristics. Consequently, configuration files created for one environment don't necessarily apply to another and cannot be migrated as part of job deployment, so new configuration files had to be created for each different environment. In addition, parallel configuration files had to be manually modified to accommodate any system changes, such as addition or removal of resource disks, nodes, and node pools etc.

U.S. patent application 2009/0193427 mitigates the complexity of various steps needed for manually generating a configuration file, including defining node pools and storage resources, describing processing nodes, and managing the transformation of configuration files to different parallel execution environments.

Job design for parallel data integration includes two major components: data flow and parallel configuration. A data flow contains stages and links, and represents logic in terms of how data is transformed while flowing through from source to target. Parallel configuration indicates the number of partitions needed for processing data in parallel, and is usually specified in a configuration file. Separating data flow from parallel configuration, which is taught herein, allows the user to concentrate on logic during job design without worrying about parallelism. Once the logic has been verified, the user may then want to specify a parallel configuration file to meet job performance requirements.

Choosing an appropriate parallel configuration is very important, as it not only directly determines job performance, but also has great impact on efficiency and resource utilization of a parallel execution environment, especially when the environment is used as a shared IT resource for data integration at the enterprise level. However, it is difficult for users to create an optimized parallel configuration file due to a lack of knowledge about job resource requirements, such as whether the job consumes high/medium/low CPU, and what is the minimum requirement of disk space/scratch space/memory. Job resource requirements also depend on the size of input data and the number of processing partitions, which makes it even more difficult for the user to determine appropriate parallel configurations in various situations. To further complicate matters, an efficient parallel configuration when the job is the only one executing on the system may not be the same as when the job has to share those system resources with other executing jobs.

An inappropriate parallel configuration often leads to a series of problems. A job aborts because the system runs out of disk space, scratch space, or memory. A highly CPU-intensive job does not perform well due to fewer numbers of partitions being defined in the parallel configuration file than the job actually needs, or the same job meets its performance requirements but uses more partitions than absolutely necessary, causing some resources to be wasted. For example, running a job in 8-way parallel on 2 physical compute nodes may only improve performance by 10% compared to running 4-way parallel on 1 physical compute node. If resource utilization is an overriding consideration, then an appropriate configuration in this situation is to use 1 physical compute node with 4 logical partitions.

CPU consumption of the same job can also vary widely depending upon the size of input data set. If the data set is small for one execution and the user chooses to use 4 logical partitions on 1 physical compute node, the machine will be underutilized and resources will be wasted. An appropriate configuration here is to allow multiple low CPU-intensive jobs to run on the same physical node, to better utilize machine resources. Since there are many dynamic factors which influence the efficiency of jobs, the definition of an optimized parallel configuration file is problematic.

Even if the user manages to find an appropriate parallel configuration with the right number of physical compute nodes and the right number of logical partitions to meet job performance requirements, the configuration may not be optimal considering the overall efficiency of the entire parallel execution environment. As mentioned above, in traditional parallel data integration, a parallel configuration file is manually created by the user and saved on disk, and often shared by other users for different jobs. Using similar parallel configuration for different jobs may cause jobs to run on some machines not others. The system becomes unevenly loaded, leaving some machines overstressed, which unavoidably causes job performance degradation. In a grid environment, this process is improved by dynamic configuration file generation where a parallel configuration file is created on the fly using dynamically allocated resources. However, the improvement may be limited if the dynamic parallel configuration file is still based on a user-specified number of physical and logical partitions. As discussed above, the user often cannot provide the right number of partitions, and even so the parallel configuration may not be optimal from the system perspective. Therefore, it is very important to automatically define an optimal parallel configuration for each job based on its resource requirements and the availability of system resources.

In embodiments of the present invention, an automated system, method, computer program, computer program product or combinations thereof automatically categorize jobs in terms of CPU utilization in three different classes: high, medium, and low CPU consumption. Other resources such as memory, disk space, and scratch space are estimated and compared with the amount of resources provided by the execution environment. Each physical compute node is configured to run jobs from different classes. For example, a physical compute node can simultaneously execute one high CPU consumption job, or two medium CPU consumption jobs, or four low CPU consumption jobs, or a combination such as one medium and two low CPU consumption jobs. An optimal parallel configuration is automatically generated for the user based on historical runtime statistics, job resource requirements and the availability of system resources. Responsive to the generated configuration, resources are automatically allocated, which frees users from manually specifying the number of physical and logical partitions and improves individual job performance. This also tends to better utilize system resources, which tends to improve overall efficiency of the entire parallel execution environment (e.g., SMP, MPP, cluster, or grid environment) for data integration.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
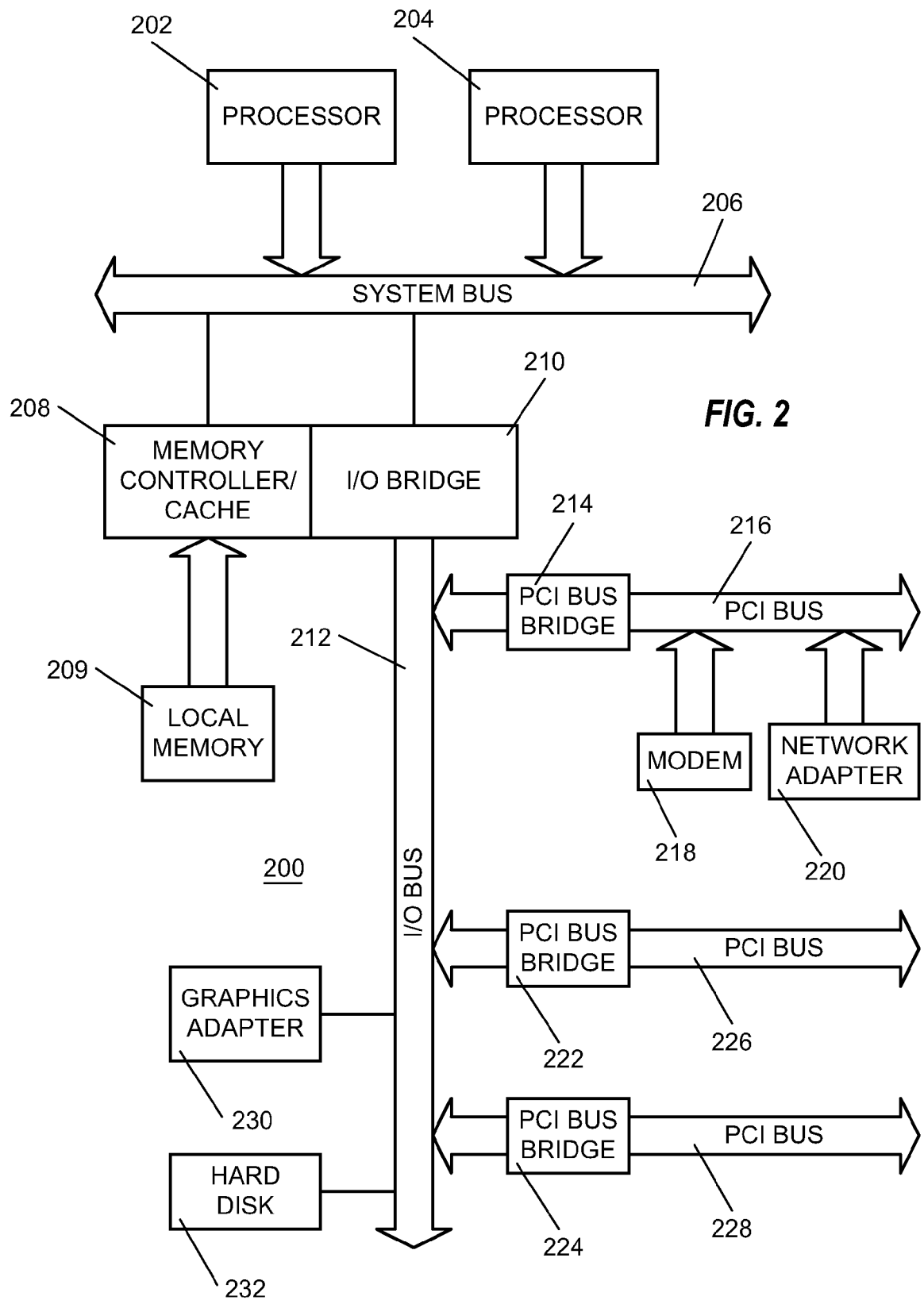
FIG. 2 is an exemplary block diagram of a server apparatus according to an embodiment of the invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2-UDB database platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

Figure 3:
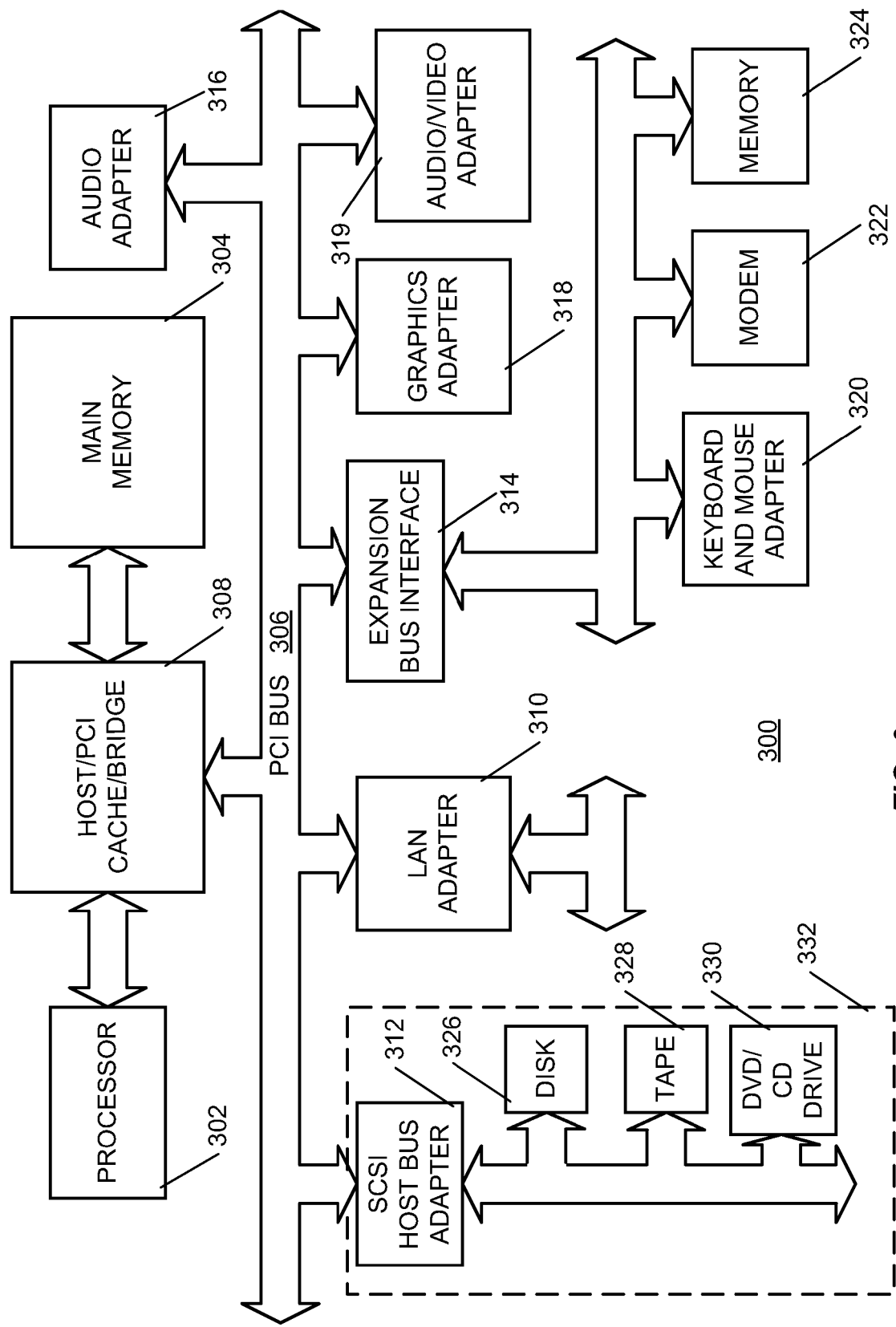
FIG. 3 is an exemplary block diagram of a client apparatus according to an embodiment of the invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

As will be appreciated by one skilled in the art, aspects of the present invention may be embodied as a system, method or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and program products according to embodiments of the invention. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The flowcharts and block diagrams in the figures illustrate the architecture, functionality, and operation of possible implementations of systems, methods and program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the descriptions herein, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 4:
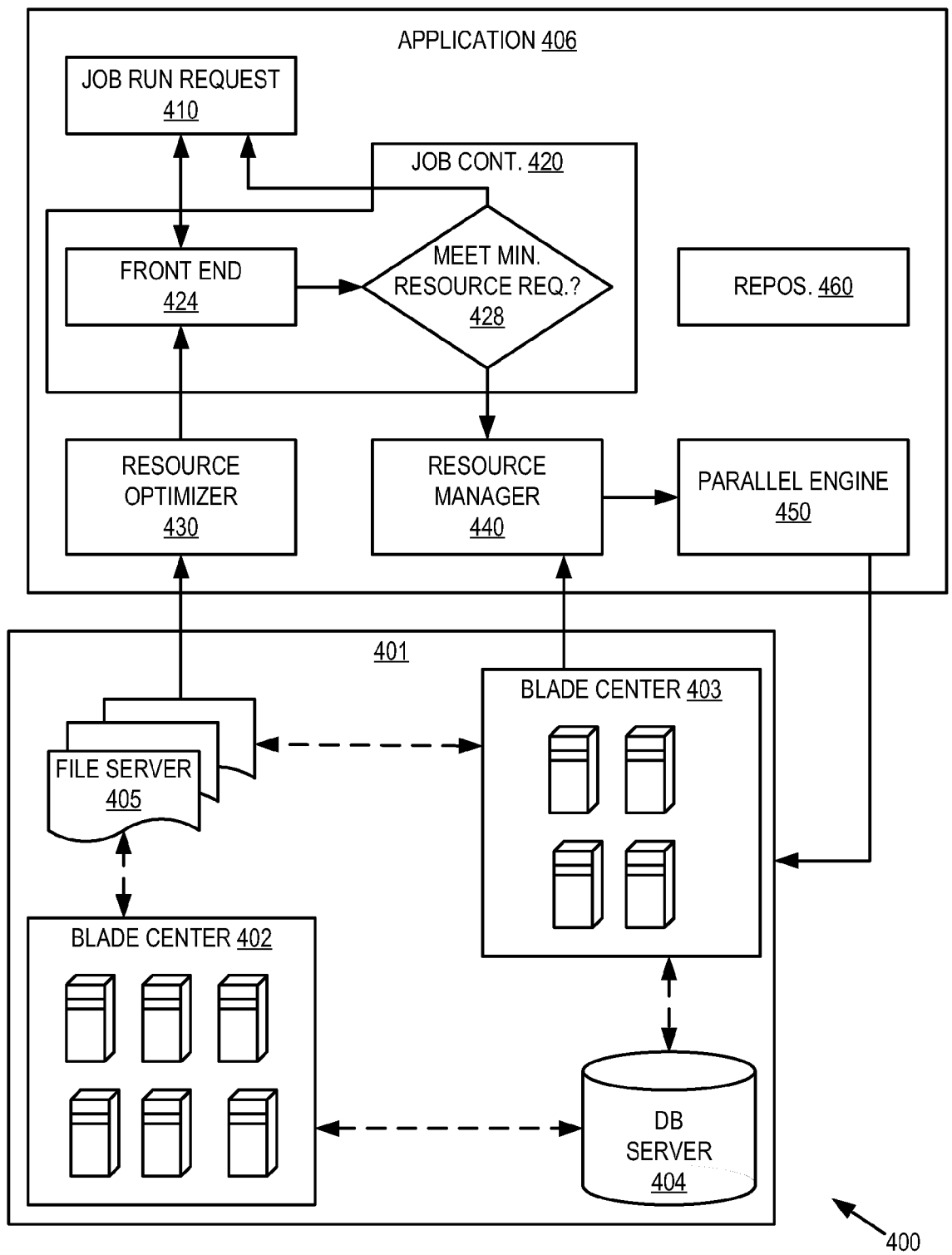
FIG. 4 is an exemplary block diagram of a grid system including an application for parallel data integration, according to an embodiment of the invention.

Referring now to FIG. 4, a resource optimization system 400 is shown, according to an embodiment of the present invention. System 400 includes grid resources 401. Grid resources 401 include a file server 405, a database server 404 and first and second blade centers 402 and 403, each having a plurality of servers, also referred to as server blades. Blade centers 402 and 403 may include more or less server blades in other implementations.

Each server blade has all essential functional components of a computer (e.g., processor(s), memor(ies), and so forth). Non-essential components, such as power, cooling, networking, and so forth, are provided through an enclosure (not depicted) of each blade center. Each blade center may include more or less server blades in other implementations.

System 400 (which may also be referred to herein as a "grid" or a "grid environment") may include more or less blade centers, server blades, file servers, and database servers. Additionally, the grid may include other resources, such as storages (not depicted).

Each server, server blade, or the like in grid environment 400 may be referred to as a 'physical node.' Within each 'physical node', there may be one or more 'logical nodes' or 'partitions'. For example, a server blade with dual processors can include two logical nodes, one node running on each processor. The term 'resource node' will be also used herein to refer to any physical or logical node in a grid environment.

In an embodiment of the invention, some of the physical nodes in grid environment 400, such as certain server blades, are designated as 'compute nodes' to be used exclusively for computing purposes. Compute nodes are considered to be dynamic grid resources as they are dynamically allocated to jobs at runtime. In contrast, fixed-name servers, such as file server 106 and database server 108, are considered to be static resources, also referred herein to as 'static nodes'. Disk information in each compute node is also considered to be a static resource.

Typically, configuration files are manually created prior to deployment (e.g., before runtime), such as while designing the parallel data processing jobs. Creating configuration files before runtime, however, is not possible in a grid environment because certain system resources are dynamically allocated at runtime. Hence, not all system resources to be used for executing a parallel data processing job in the grid environment will be known prior to deployment. As a result, there is a very short window of time in which to create a configuration file for the parallel data processing job (e.g., after resource allocation and before execution).

System resources specified in configuration files are usually machine names of the system resources. Consequently, a configuration file created for a parallel data processing job in one environment generally cannot be used in another environment. To given an example, suppose a configuration file is created for a parallel data processing job in an environment with one set of servers. If the parallel data processing job is to be executed in another environment with a different set of servers, then a new configuration file will have to be created because the machine names for the servers will be different.

System 400 also includes an application 406 for managing parallel data processing jobs in system 400. In an embodiment of the invention, application 406 runs on one or more of the servers of one or more of the blade centers 402 or 403. Application 406 includes a job run request module 410, a job controller 420, a resource optimizer 430, a resource manager 440, a parallel engine 450, and a repository 460. In one implementation, job run request module 410, job controller 420, resource optimizer 430, resource manager 440, parallel engine 450, and repository 460 may be stand-alone applications rather than being included in a single application 406. The invention includes embodiments in which repository 460 stores information on a computer readable medium of one or more of the following: file server 405, database server 404, and one or more of the servers of blade center 402 or 403, possibly including the same server running application 406.

Application 406 generates a user interface, which may be either a graphical user interface ("GUI" or a command line interface. Responsive to user input, job run request module 410 causes a job and the job's associated properties to be stored in a computer readable media. Likewise, job run request module 410 causes storage of job execution information, such as an indication of whether system 400 should perform parallel execution of a job, and, if so, parallel configuration information. In one implementation in a non-grid environment, parallel information is defined in a pre-created static configuration file. In one implementation in a grid environment that does not support any resource optimization mechanisms; parallel information includes the number of requested compute nodes and the number of logical partitions. In one grid environment embodiment of the present invention, parallel information includes a flag indicating that an optimal parallel configuration needs to be dynamically generated prior to job execution. The user can still choose to either use a predefined static configuration file or specify job resource requirements, as mentioned above. This makes system 400 flexible enough to handle different needs.

Job run request module 410 sends job execution information to front end module 424 of job controller 420 responsive to a command from either a GUI or command line interface. If the job execution information includes a pre-created static parallel configuration file, module 424 parses the configuration file to determine the physical machine names and explicitly reserves those machines via resource manager 440. If the job uses a dynamic configuration file, module 424 asks resource manager 440 to allocate the requested number of compute nodes and generates a configuration file after the resources have become available.

In one implementation, a user wishes a job to use resource optimization mechanisms and initiates this via user interaction with job run request module 410. (In one implementation, resource optimization may be a default condition.) In response to such an indication of resource optimization, job controller 420 calls resource optimizer 430 to obtain system resources utilization and optimized resource requirements of each job. Before job controller 420 submits a job to resource manager 430, resource requirement module 428 reviews job resource requirements and compares those requirements with system 400 resources that are available. Module 428 issues a warning to job run request module 410 if the minimum resources required to run the job exceed the available system capability. The job run request is returned in this case. The user can submit another run request after having fixed system resource problems. If system 400 is capable of accommodating the job resource requirements, module 428 submits the job to resource manager 440 for dynamic resource allocation and job execution.

Resource optimizer 430 creates statistical models using performance data collected from previous job runs to determine the optimized job resource requirements. In an implementation, the user has three options while working with resource optimizer 430: pre-creating models before running jobs, creating models while jobs are running, and updating models in a batch process every so often (e.g. every week). Each job can have multiple models associated with it, and those models are saved in a model repository. At run time, resource optimizer 430 receives resource optimization requests sent from job controller 420 and retrieves the model associated with the job, estimates job resource utilization, determines CPU categories and optimal number of partitions based on estimated resource utilization, and returns the statistics to job controller 420. Resource optimizer 430 also checks the capacity of the system resources, and sends the information back to job controller 420 along with the statistics that represents job resource requirements.

Resource manager 440 dynamically determines and allocates system resources for each job based on job resource requirements. This includes resource manager 440 placing a job into a waiting queue until the resources needed to run the job become available. Resource manager 440 then starts the job and locks the resources for the running job until the job has finished. Once a job has finished, resource manager 440 frees the resources allocated and gives those resources to a next job that has similar resource requirements. Because resource manager 440 can handle resource contention more efficiently, job performance and overall efficiency of the entire parallel execution environment is improved.

Parallel engine module 450 provides rich functionality for data integration, transformation, and movement. It is built on top of a parallel framework where jobs can run with both pipelined and data-partitioned parallelism.

The following describes how job resource requirements may be defined and what may be included in a job run request that is produced by module 410, according to an embodiment of the present invention. This is followed by a description of how both job controller 420 and resource optimizer 430 may be implemented and integrated to more nearly optimize resource utilization for parallel data integration on grid, according to an embodiment of the present invention.

Job Resource Requirements

Concerning job resource requirements, a parallel job requires a certain amount of machine resources in order to run successfully. These resources include CPU, memory, disk space, and scratch space, as previously mentioned. The amount of resources needed may vary depending on the type of the job and the amount of input data to be processed. In a non-grid environment, or a grid environment lacking resource optimization mechanisms, job resource requirements must be submitted as part of a job run request. In an embodiment of the present invention, resource requirements are dynamically determined and allocated for each job. In such an embodiment, the user no longer needs to submit those requirements as part of a job run, but may do so. This manual feature provides backward compatibility and usage flexibility, an embodiment of the current invention continues to support user-defined job resource requirements.

In one implementation, a GUI generated by application 406 for user interaction with job run request module 410 presents a screen to a user having a checkbox for enabling or disabling resource optimization and automatic configuration file generation at a project level. In one implementation, the checkbox is selected by default, meaning the resource requirements of each job in the same project are automatically determined by application 406 based on automatic resource optimization mechanisms described herein.

The GUI also presents a job properties screen. The default status of the checkbox can be overwritten at the job level by enabling a grid properties tab on the job properties screen and specifying resource requirements on the resulting grid properties screen. A CPU properties tab is included on the grid properties screen to let the user manually assign the job to an appropriate CPU utilization category, i.e., high, medium, or low CPU utilization, in the particular embodiment of the invention that is illustrated herein. The user can de-select the checkbox, which causes application 406 to revert back to the automatic resource optimization mechanisms.

Job resource requirements include:
  number of physical compute nodes
  number of logical partitions on each physical compute node
  type of CPU utilization: high/medium/low CPU consumption
  CPU time
  job execution time
  amount of disk space
  amount of scratch space
  amount of memory Job Run Request Concerning a job run request, the request can be sent from job run request module 410 to job controller 420 responsive to a command via a GUI or command line interface. As mentioned earlier, in an embodiment of the present invention, a job run request contains data-flow description but not parallel configuration information about job resource requirements, since resource optimization mechanisms described herein automatically determine the resources that are needed to run the job and dynamically generate a parallel configuration file.

Job Control

Concerning job control, job controller 420 provides job compilation, job validation, job execution, configuration file generation, and job report. Mechanisms for job compilation, job validation, and configuration file generation are described in detail in one or more of the above referenced patent applications. These mechanisms apply regardless whether resource optimization features are enabled, i.e., features disclosed herein.

For automatic configuration file generation in an embodiment of the present invention, if the user chooses to use sequence-level resource configuration for all parallel jobs (e.g., one configuration file for all parallel jobs within a user-specified sequence of jobs), resource optimizer 430 automatically designates a number of physical compute nodes for the job sequence, where the designated number is equal to the maximum number of physical compute nodes determined among all the jobs in the sequence. Likewise, resource optimizer 430 automatically designates a number of partitions, scratch space, and disk space required by a job sequence based on the maximum numbers of these resources requested among the jobs.

For each job, resource optimizer 430 generates a job report stored in repository 460, which includes a message indicating a CPU category for the job, e.g., high, medium or low CPU consumption.

Job controller 410 reads in the job report generated by resource optimizer 430 and requests the indicated number of physical nodes from resource manager 440. Once the resources become available, job controller 410 generates a parallel configuration file. This configuration file contains the number of physical nodes and the number of logical partitions per physical node determined by resource optimizer 430.

Figure 5:
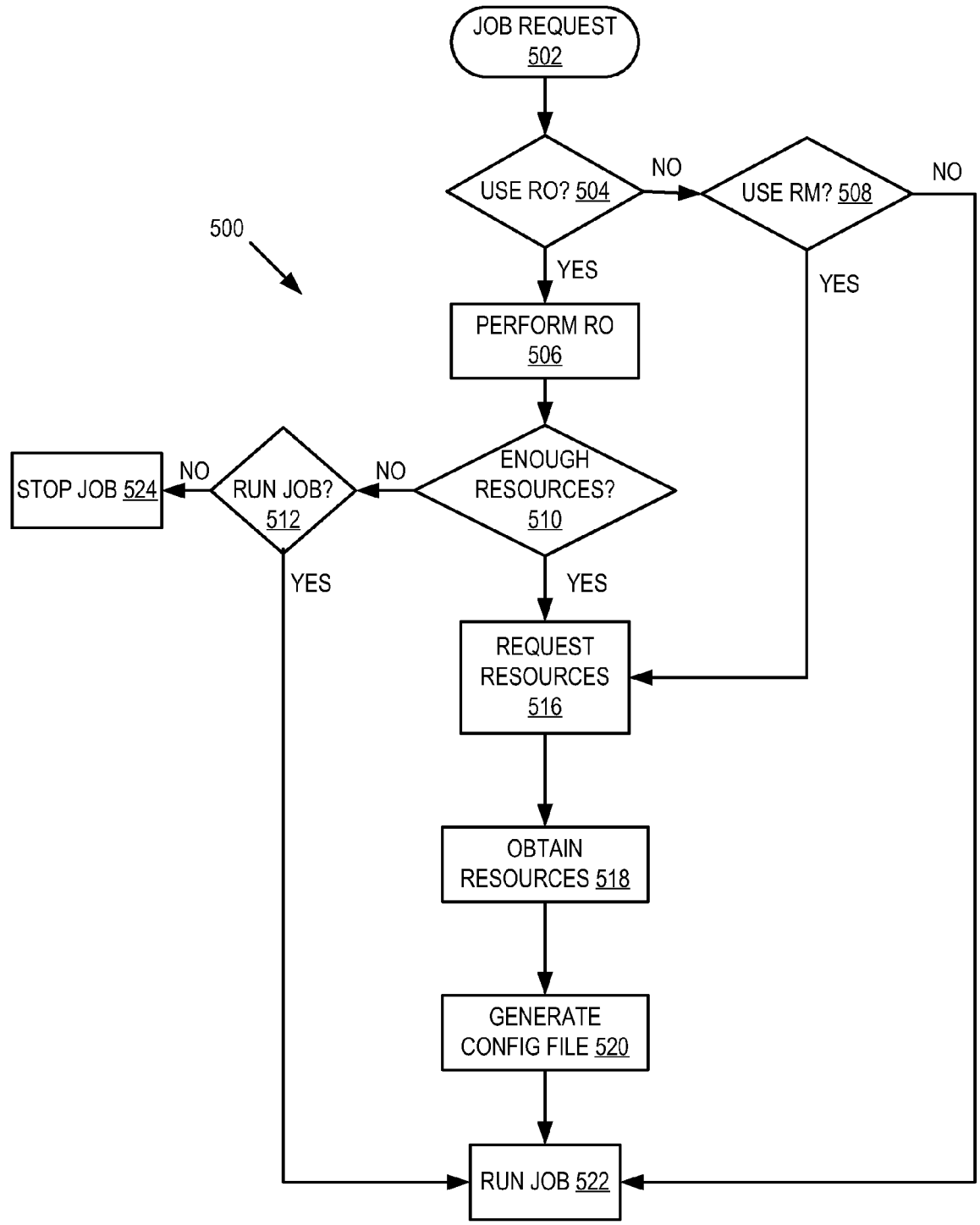
FIG. 5 illustrates work flow for parallel data integration in the system of FIG. 4, according to an embodiment of the invention.

FIG. 5 shows a flow chart 500 of job execution sequences when resource optimization is enabled on grid 401, according to an embodiment of the present invention.

Referring to both FIGS. 4 and 5, job controller 420 receives and parses 502 a job run request 410 and determines a next step based on actions specified in request 410. Responsive to determining 504 that job run request 410 says to use resource optimizer 430, job controller 420 calls resource optimizer 430, which, in turn, determines 506 job resource requirements. Once job controller 410 receives job resource requirements returned from resource optimizer 430, job controller 410 compares 510 the requirements with available system resources. If job resource requirements can be met, job controller 420 then calls resource manager 440, which, in turn, asks 516 for resources. Once the requested resources become available, job controller 420 obtains resources 518 and generates 520 parallel configuration file. Resource manager 440 then starts job execution 522.

If the job run request 410 does not say to use resource optimizer 430, then responsive to job controller 420 determining 508 that job run request 410 indicates resource manager 440 should be used, job controller 420 calls resource manager 440, which, in turn, asks 516 for resources as specified in job run request 410, and flow 500 proceeds as described above.

If job controller 420 determines 504 that job run request 410 does not indicate to use resource optimizer 430, and determines 508 that job run request 410 does not indicate to use resource manager 440, job controller 420 then starts job execution 522.

If job controller 420 determines 504 that job run request 410 indicates to use resource optimizer 430 and if estimated job resource requirements cannot be met, as determined by job controller 420 comparing 510 job resource requirements to availability, job controller 420 warns 512 the user. If job controller 420 determines 512 that job run request 410 says to run the job anyway, job controller 420 starts job execution 522 (without calling resource manager 440). If job controller 420 determines 512 that job run request 410 says not to run if there are not enough resources, job controller 420 simply returns 524 job run request 410 without executing the job.

Resource Optimizer

According to an embodiment of the present invention, resource optimizer 430 provides features that operate in cooperation with, and in addition to, the previously disclosed resource estimator tool in order to provide resource optimization at a job level. (Resource optimization at a system level is handled by resource manager 440.) Particularly, the resource estimation tool is shown in and described as resource estimation tool 124 in FIGS. 1 and 2 of related United States Published Patent Application 2008/0114870, among other places. Accordingly, it should be understood that resource optimizer 430 of the present patent application is herein added to what is shown as resource estimation tool 124 in FIGS. 1 and 2 of the 2008/0114870 application. Consequently, in addition to what is disclosed herein, resource optimizer 430 also receives the inputs of and provides the functions and outputs of the earlier disclosed resource estimation tool 124. References herein to resource optimizer 430 should be understood to include reference to resource estimation functions described in the 2008/0114870 application, so that FIGS. 1 and 2 of the 2008/0114870 application are particularly relevant for understanding inputs and outputs of resource optimizer 430.

Figure 6:
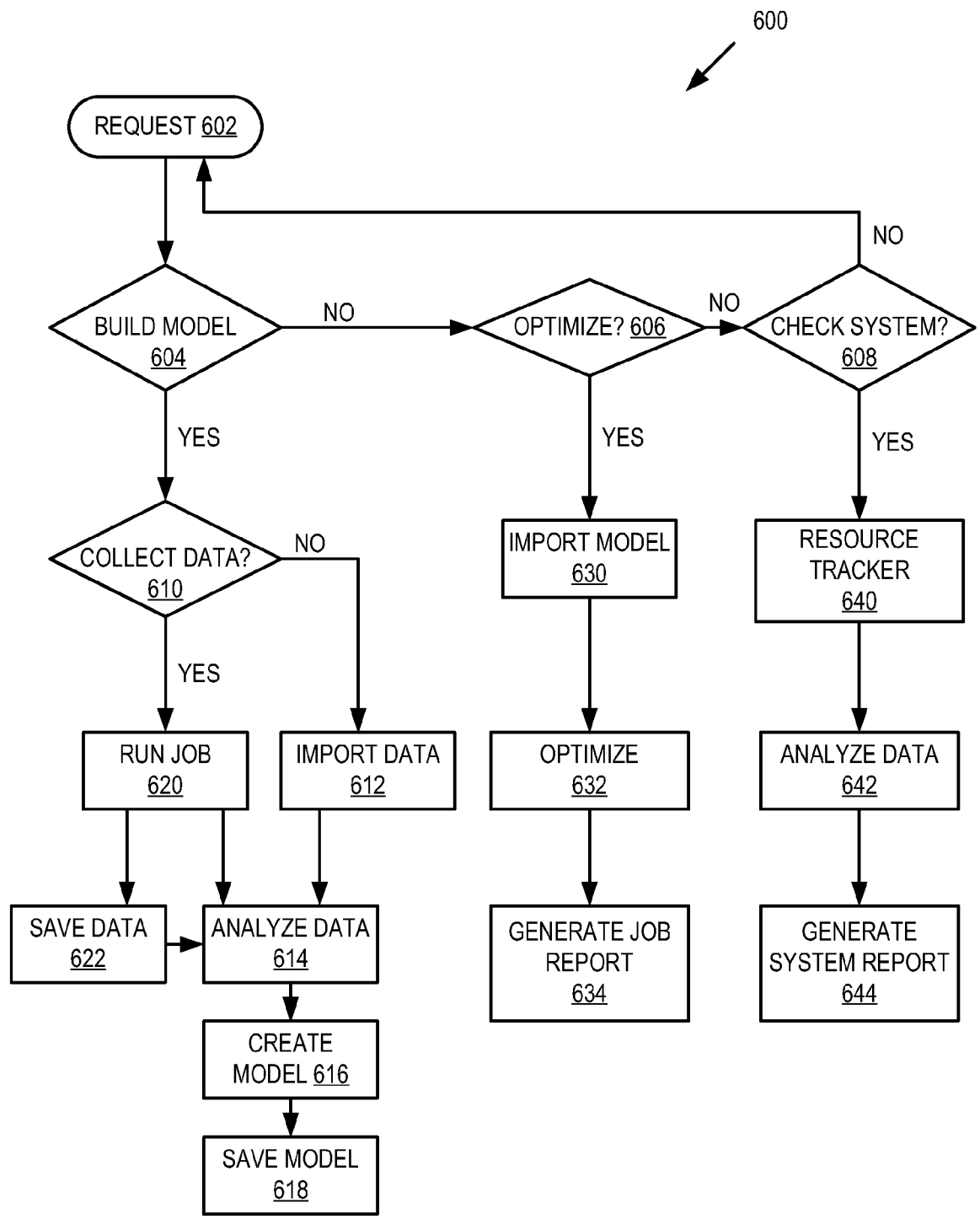
FIG. 6 illustrates work flow for a resource optimization module of the parallel data integration application of FIG. 4, according to an embodiment of the invention.

FIG. 6 illustrates work flow 600 of resource optimizer 430, according to an embodiment of the present invention.

Resource optimizer 430 work flow 600 begins at receiving 602 a user request for a job. (The user request for a job is initiated via user interaction with job run request module 410 in one embodiment of the invention.) Three major modes of action are included in work flow 600, which a user can choose to use one at a time. The modes include build model 604, optimize resources 606, and check available system resources 608. When a user selects to build an analytic model 604, the user indicates at 610 whether the model should first collect performance data. If no, resource optimizer 430 builds the model using pre-collected performance data, so resource optimizer 430 first imports data 612, analyzes data 614, then creates the model 616 based on data analysis 614 and saves the model 618. If performance data is not provided, resource optimizer 430 first runs job 620, collecting and saving some performance data 622. Resource optimizer 430 then analyzes the data 614 from collecting and saving 622, creates 616 the model based on data analysis 614 and saves 618 the model. The performance data collected in this mode can be used later together with other performance data to refine a model.

If the user selects to optimize resources 606, a model is imported 630. The user may specify an existing model that can be used at 630 to perform such optimizations. If a model is not explicitly specified, a model that has been built most recently is obtained at 630. A report on job resource requirements is generated 634 once resource optimization 632 has been performed. A third mode is to check system resources 608. In this mode, resource optimizer 430 may invoke an external component/tool (e.g. resource tracker 640) to analyze system resource statistics 642 and generate a report 644, which provides a snapshot of the system and its capacity.

Resource Optimization Request

A request 602 can contain some or all of the following directives:
- action mode: build, optimize, or check
- model type: analytic
- model name
- performance data: the location where performance data is stored
- job report name
- system report name
- data flow description Not all directives and options are required for each request 602. When a directive or an option is omitted, a default value is assumed. The default action mode is optimize, default modeling type is analytic, default model name and job report name are generated based on the job name, and default system report name is stdout. The data flow description must be present if the mode is build. Performance data can be normally stored in a file.

Performance Data

Performance data is used as sample data by resource optimizer 430, in an embodiment of the present invention, for building a model that is capable of estimating job resource utilization when presented with information for a new job. Resource optimizer 430 collects the performance data at three different levels while a job is running on each partition: link level, operator level, and job level.

Performance data at the link level per partition includes:
input data size
input number of records
input data throughput: number of input records per second
output data size
output number of records
output data throughput: number of output records per second Performance data at the operator level per partition includes:
CPU time
CPU percentage
execution time
disk space
scratch space
memory usage Performance data at the job level per partition includes:
total CPU time
total CPU percentage
total execution time
total disk space
total scratch space
total memory usage
number of processes Performance data can be collected from run to run with the same number of partitions, or with increasingly varying number of partitions. Performance data collected from different parallel configurations is useful for determining the optimal parallelism that helps best utilize system resources. There are many different ways to store performance data. Serializing data and saving data to disk is one way.

Analytic Model

Figure 7:
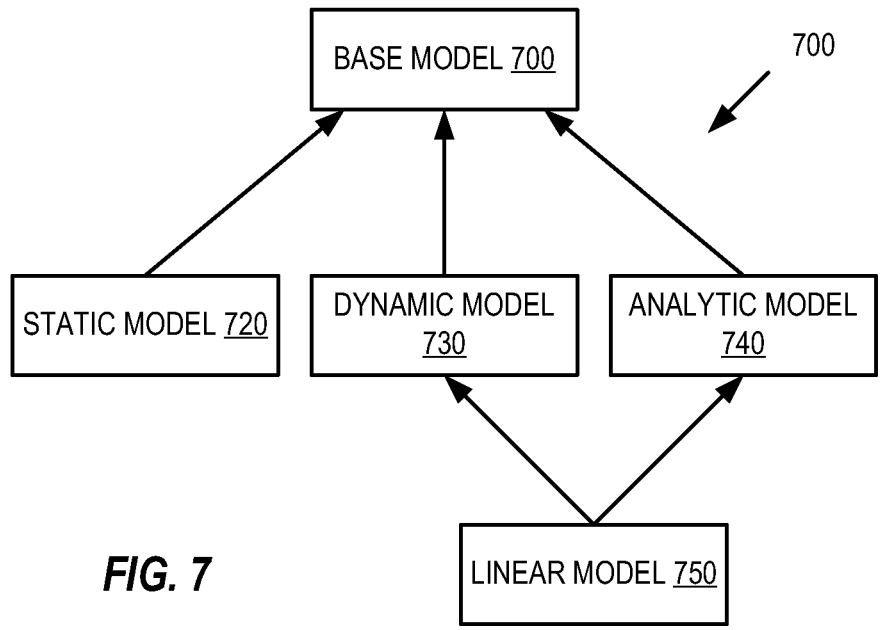
FIG. 7 illustrates a hierarchy of optimization models, according to an embodiment of the invention.

Resource optimization module 430 is capable of creating a number of different models in a hierarchical structure as illustrated in FIG. 7, including a base model 710 at the simplest level of the hierarchy. More complex models include a static model 720, a dynamic model 730 and an analytic model 740, which is a particular type of model provided according to an embodiment of the present invention. Analytic model 740 differs from other models in that it analyzes job run-time characteristics based on performance data collected from previous runs over time, whereas static model 720 does not use any performance data and dynamic model 730 uses segments of performance data from one job run. Compared to models 720 and 730, analytical model 740 is more flexible and accurate.

Model Description

Analytic model 740 extends dynamic model 730, in part because model 740 is based on performance data from job runs with a complete set of input data, not segments of input data. Resource optimizer 430 can determine correlation coefficients for analytic model 740 using a multiple linear regression and least squares method, which is discussed for a dynamic model 730 in one of the incorporated patent applications. To produce the coefficients for a model 740, resource optimizer 740 considers multiple job runs as being one job run having multiple segments, where each segment contains a complete set of input data.

In an embodiment of the invention, if performance data contains statistics collected from different parallel configurations, resource optimizer 430 uses analytic model 740 to compute an optimal number of physical compute nodes based on the collected performance data and a predetermined optimization criterion, which may be user-selected, such as shortest execution time, least amount of CPU time per partition, or shortest runtime of the batch of jobs.

In one instance of a high CPU job, which is a category explained herein below, using model 740 resource optimizer 430 estimates that execution time would be 20 minutes if the job is run on 1 physical compute node, 10 minutes on 2 physical compute nodes, and 6 minutes on 4 physical compute nodes. If specified performance requirements include a requirement to finish the job within 6 minutes, resource optimizer 430 determines that the configuration with 4 nodes is optimal, because it meets the specified execution time performance requirement.

If execution time is not so limited by specified performance requirements, resource optimizer 430 determines that the optimal number of compute nodes is 2, in an embodiment of the invention. This is because in the embodiment of the invention, if there is no specified maximum execution time, resource optimizer 430 seeks to optimize resource usage tradeoffs between resource utilization and job performance by minimizing a particular measure of resource utilization, e.g., execution time×number of nodes (node-minutes), wherein if there are configurations having equal overall execution time, resource optimizer 430 selects the configuration with the least number of nodes. In the illustrated instance, the number of nodes×execution time=20 node-minutes for the 1-node configuration, 20 node-minutes for the 2-node configuration, and 24 node-minutes for the 4-node configuration. However, since the job is a high CPU job, resource optimizer 430 does not select a single node configuration, in this embodiment of the invention. Therefore, in the illustrated instance, resource optimizer 430 selects the 2-node configuration, which achieves a little better node-minute execution time than the 4-node configuration and does so with fewer nodes.

In an alternative, resource optimizer 430 seeks to optimize the tradeoff between resource usage and job performance by minimizing node-minutes, wherein if there are configurations having equal node-minutes, resource optimizer 430 selects the configuration with the least number of nodes. For this alternative rule, in the illustrated instance, resource optimizer 430 would select the 1-node configuration, which achieves the same, 20 node-minute execution time as the 2 node configuration, but does so with less nodes.

Major steps associated with creating an analytical model (616 FIG. 6) include:
Step: Determine segments for holding data from all available performance data files.
Step: For each performance data file:
Read performance data.
Parse performance data.
Store parsed performance data as data objects in respective segments.
Step: Calculate resource usage using parsed performance data for each one of the segments. For example, in one embodiment of the invention resource usage includes respective CPU times and execution times for the respective segments.

Step: Determine correlation coefficients using the multiple linear regression and least square method discussed in one of the incorporated patent applications for all statistics collected in performance data. That is, the collected performance data provides instances of observed performance, and includes data that the model assumes are for performance causes, e.g., input data size and number of input records on each link, etc., and data that the model assumes are for performance effects, e.g., data throughput, CPU time, etc. A correlation coefficient is calculated for each performance cause in the model responsive to the cause and effect performance data. (See list of performance data herein above.)

Step: Save model by serializing the correlation coefficients to disk.

Like other types of models (static model 720 and dynamic mode 730), analytic model 740 can be used to predict, i.e., estimate, job resource utilization for any given input data size based on known correlation coefficients. (Refer to list of performance data herein above for statistics the analytic model can predict.)

Analytic model 740 and its use by resource optimizer 430 are distinguishable from static model 720 and dynamic model 730 in that analytic model 740 can optimize resources based on the estimated resource utilization that the model predicts. In particular, resource optimizer 430 uses analytic model 740 to predict resource utilization and performance, e.g., CPU times and execution times for a job, operators and groups of operators, then computes CPU indices for the same. Then resource optimizer 430 uses model 740 to determine CPU categories of the respective CPU indices and uses this category information to optimize resources, e.g., determine an optimal number of partitions for each operator, group of operators or job. Further details about this resource optimization methodology are described herein below.

Model Repository

A job can have more than one analytic model 740. But only one of the models 740 can be used for the job each time the job's resource requirements are estimated. Models 740 can be stored in different ways. One way is to store to disk correlation coefficients and other model-related objects in a series for a corresponding series of models.

Model Deployment

Models 740 are exported as part of job export for deployment purposes. Then, when jobs are imported into a different environment, models 740 are moved into this environment as part of this process. A model 740 built in one environment can be used in another environment running the same configuration (both hardware and software).

Resource Optimization Methodology

In the exemplary work flow 600 of FIG. 6, resource optimization 632 is a second major functionality provided by resource optimizer 430, according to an embodiment of the present invention. Resource optimizer 430 module predicts job resource utilization using an analytic model 740 that is most recently built or that provided by the user, as previously mentioned. Data can be imported from various sources, including file, datasets, file sets, database tables, or the output from another program. Resource optimization 632 for a job includes determining input data size for each data source used by the job. Resource optimization 632 next includes analytic model 740 using this information as an input to compute resource requirements.

Resource optimization 632 not only predicts job resource utilization (e.g., CPU time and execution time, in one embodiment of the invention) but also makes intelligent decisions by classifying predicted job resource utilization (e.g., high, medium or low CPU usage, in one embodiment of the invention) and then using this information to determine resource requirements (e.g., number and allocation of nodes and partitions, in one embodiment of the invention).

Regarding the classifying, in one implementation, resource optimization 632 uses a ratio of CPU time to execution time of the job. If the ratio is greater than 0.6, resource optimization 632 categorizes the job as a high CPU job. If the ratio is greater than 0.3 but less than 0.6, resource optimization 632 categorizes the job as a medium CPU job. Otherwise, resource optimization 632 categorizes the job as a low CPU job. In another implementation, resource optimization 632 defines a range of the CPU time for jobs in different categories. For low CPU jobs, the range of the CPU time varies from 0 to 300 seconds, in one instance. For medium CPU jobs, the range varies from 300 to 900 seconds, in one instance. Any jobs that consume more than 900 seconds of CPU are considered high CPU jobs in one instance.

In the job resource report 634 generated by resource optimizer 430, there is an attribute called "class" which shows the class the job belongs to in terms of its CPU consumption. The value of this attribute is one of high, medium, or low, as described above.

For low or medium CPU jobs, it is optimal to configure each such job to run on one physical compute node. Therefore, for each low or medium CPU job, resource optimization 632 indicates on the generated job report that the job should run on only one physical computer node.

Further, since a single low or medium CPU job cannot consume all CPU of a physical compute node, it is optimal to run multiple such jobs on the same physical compute node. One example is to run 4 low CPU jobs, 2 medium CPU jobs, or 1 high CPU job on one physical compute node. For an extremely high CPU job (the ratio between CPU time and execution time is greater than 0.95), the job needs to run across multiple physical compute nodes.

Figure 9:
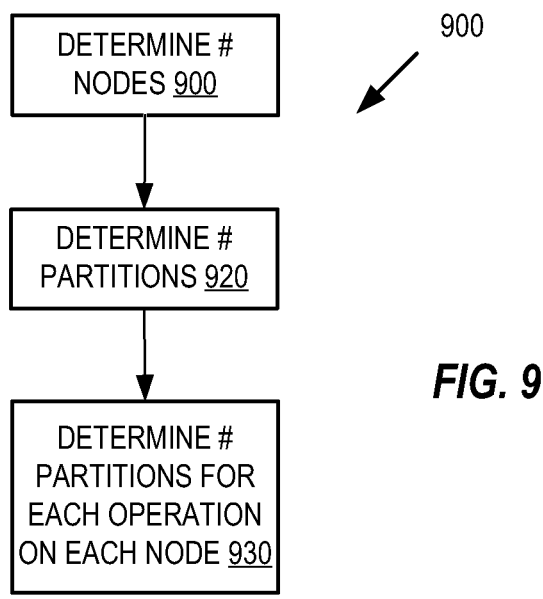
FIG. 9 depicts a flowchart of a resource optimization process, according to an embodiment of the invention.

Referring now to FIG. 9, a process 900 of resource optimization 632 is illustrated, according to an embodiment of the invention. Resource optimization 632 determines 910 the number of physical nodes and determines 920 the number of logical partitions on each physical node for a job and outputs this in a job report. In one embodiment of the present invention, an algorithm to determine the optimal number of physical compute nodes for an extremely high CPU job includes estimating CPU time for a job running on 1, 2, and 4 nodes, respectively. If the CPU ratio (also referred to herein as "CPU index") is greater than 0.8, meaning the job is high CPU on each compute node, resource optimizer 430 then adds more nodes in estimating job resources until the CPU ratio is lower than 0.8.

Resource optimization 632 also determines 930 a number of partitions per physical node for each operator and also outputs this in the job report.

Attributes in the job report indicate, respectively, the number of physical nodes for the job, the number of logical partitions for the job on each physical node, and the number of logical partitions for each operator of the job on each physical node.

To determine 920 the number of logical partitions allocated to the job for each physical node, resource optimization 632 uses approach 3 described herein below under "Optimal Number of Partitions." To determine 930 the number of logical partitions for each operator, resource optimization 632 uses approaches 1 and 2. The number of logical partitions determined 930 at the operator level overrides that determined 920 at the job level, except that if the value of an attribute for a number of logical partitions is zero for a particular operator on a particular node, then process 930 uses for this operator on that particular node the number of logical partitions determined 920 for the job on that particular node.

Runable Groups

In one of the related patent applications, a data flow is described that has one or more of three types of runable groups: input group, vertical group, and scratch group. In an embodiment of the present invention, a different perspective is introduced in which a data graph is also considered to include runable groups of four types: data source group, processing group, scratch group, and data sink group. A data source group contains all data sources. A data sink group contains all data sinks. There is only one data source group and one data sink group per job. A scratch group contains sort and buffer operators where data may end up being saved on disk temporarily during run time. A processing group contains operators that perform more CPU intensive operations. A scratch group is similar to a data source or a data sink group in that it generates a lot of I/O operations. A scratch group is also similar to a processing group in that it also needs a lot of CPU for processing data. In an embodiment of the present invention, processing groups are the same as the vertical groups described previously. Accordingly, methods for constructing both processing and scratch groups are as described previously.

In an embodiment of the present invention, both ways of defining groups are used, i.e., the first way of defining groups that may include the three group types mentioned above, and the second way of defining groups that may include the four group types mentioned above. Resource optimization 632 uses the first way for predicting resource utilization, as described in one of the related patent applications. Resource optimization 632 uses the second way for optimizing resources, e.g., determining the CPU category and the optimal number of logical partitions on each physical compute node. Input groups in the first way are referred to as data sources in the second. Data sinks are part of vertical groups in the first way, but are a stand-alone group in the second. Vertical groups other than data sinks in the first way are referred to as processing groups in the second.

Execution Time

The elapsed time for running a job is the sum of three parts: startup time, execution time, and shutdown time. The startup time is the time for the job to set up the parallel execution environment, including creating section leaders on each partition, instantiating operators on each partition, and setting up data connections among operators on all partitions, etc. The shutdown time is the time from the moment all operators from all partitions finish processing data until the job finishes cleaning up the parallel execution environment. The execution time is the time from the moment the data source operators start to process the first record until the moment the data sink operators have finished processing all records. Since the data sink group is the last group to run to completion, the maximum execution time among operators in the data sink group represents the execution time of the job. Because a job runs in parallel, the number of records needed to be processed on each partition is different, which means the execution time can be different on each partition. The execution time of the job is the maximum execution time among all partitions. The startup time and shutdown time are usually short, so only the execution time is considered here.

CPU Category

As previously mentioned, resource optimization module 632 will automatically classify a job in one of three CPU categories: high CPU, medium CPU, and low CPU. The user can also explicitly assign a CPU category to a job. (The user may do this by the user interface to job run request module 410 of FIG. 4.) If the user specifies a CPU category, job controller 420 uses this category. Otherwise, resource optimization module 632 automatically determines a job's CPU category based on estimated resource utilization, which is determined using analytic model 740. Additional details for automatically determining a job's CPU category are next described.

In various embodiments of the present invention, there are various different ways of determining a job's CPU category. In one embodiment of the present invention, resource optimization module 632 uses a CPU index to help determine whether or not a job is high CPU, medium CPU, or low CPU. Three ways to define the CPU index of a job are described below. Resource optimization module 632 uses all three ways to determine the CPU category of the job, compares the results produced, and designates the highest result as the CPU category for the job. Resource manager 440 uses this category to determine the number of jobs on a node and resource optimizer 430 uses this category to determine the number of physical nodes for a job.

Approach 1—CPU Index at Operator Level

In a first way of determining CPU classification for a job, resource optimization module 632 uses the CPU index of the most CPU-intensive operator to determine the CPU index of the job. Let $CT_i^p$ represent the estimated CPU time of operator i on partition p, $ET_i^p$ represents the estimated execution time of operator i on partition p, the CPU index for operator i on partition p can be written as:

$$Icpu_i^p = CT_i^p / ET_i^p \qquad (1)$$

The CPU index for operator i is:

$$Icpu_i = \max\{CT_i^0/ET_i^0, \ldots, CT_i^p/ET_i^p, \ldots, CT_i^{P-1}/ET_i^{P-1}\} \qquad (2)$$

where P is the number of logical partitions that the operator i runs on.

The CPU index of a runable group is represented by the maximum CPU index among all operators of that group.

$$Icpu_g = \max\{Icpu_0^g, \ldots, Icpu_i^g, \ldots, Icpu_{I-1}^g\} \qquad (3)$$

where I is the number of operators in group g.

The CPU index of the job is represented by the maximum CPU index among all runable groups.

$$Icpu = \{Icpu_0, \ldots, Icpu_g, \ldots, Icpu_{G-1}\} \qquad (4)$$

where G is the number of runable groups of the job.

The algorithm to determine the CPU index of the job is given as follows:

```
for each runable group g
    for each operator i inside g
        for each partition p among all partitions of operator i
            calculate Icpu_i^p using Eq. (1)
        determine Icpu_i using Eq. (2)
    determine Icpu_g using Eq. (3)
determine Icpu using Eq. (4)
``` determine the CPU category based on the CPU index of the job as follows:
    If Icpu≥0.6, the job is a high CPU job.
    If 0.3≤Icpu≤0.6, the job is a medium CPU job.
    If 0≤Icpu≤0.3, the job is a low CPU job.

Approach 2—CPU Index at Group Level

It is possible that the job does not have one very CPU intensive stage, but one or multiple runable groups may be CPU intensive. In this case, it is necessary to use a different approach to define the CPU index and further to determine the CPU type of the job based on its CPU index. In a second way of determining CPU classification for a job, resource optimization module 632 defines the CPU index of the job as the ratio between the maximum estimated CPU time among processing and scratch groups and the maximum estimated CPU time among data source and data sink groups.

Let $CT_i^g$ represent the estimated CPU time of operator i in group g on all partitions:

$$CT_i^g = \sum_{p=0}^{P-1} CT_i^p \tag{5}$$

Let $CT_g$ represent the estimated CPU time of group g on all partitions:

$$CT_g = \sum_{i=0}^{I-1} CT_i^g \tag{6}$$

The maximum estimated CPU time among all processing and scratch groups is:

$$CT_{psg}^{max} = \max\{CT_{psg}^0, \ldots, CT_{psg}^m, \ldots, CT_{psg}^{M-1}\} \tag{7}$$

where psg represents processing and scratch groups, M the number of total processing and scratch groups of the job.

The maximum estimated CPU time among data source and data sink groups is:

$$CT_{ssg}^{max} = \max\{CT_{ssg}^o, \ldots, CT_{ssg}^n, \ldots, CT_{ssg}^{N-1}\} \tag{8}$$

where ssg represents data source and data sink groups, N the number of total data source and data sink groups of the job. The CPU index of the job is defined as:

$$Icpu = CT_{psg}^{max} / CT_{ssg}^{max} \tag{9}$$

The algorithm to determine the CPU index of the job is given as follows:

```
for each runable group g
    for each operator i inside g
        for each partition p among all partitions of operator i
            calculate CT_i^g using Eq. (5)
        calculate CT_g using Eq. (6)
    determine CT_psg^max using Eq. (7)
    determine CT_ssg^max using Eq. (8)
    determine Icpu using Eq. (9)
``` determine the CPU category based on the CPU index of the job as follows:
  If Icpu≥2, the job is a high CPU job.
  If 1≤Icpu≤2, the job is a medium CPU job.
  If 0≤Icpu≤1, the job is a low CPU job.

Approach 3—CPU Index at Job Level

It could also be possible that the job does not have any CPU intensive runable groups, but the job has a large number of running processes and the total CPU percentage of all processes is large. For this case, there is a third way of determining CPU classification for a job, in which resource optimization module 632 defines the CPU index of the job as the total CPU percentage of all processes.

Let $CP_i^p$ represent the estimated CPU percentage of operator i on partition p, $CP_i^g$ represent the estimated CPU percentage of operator i in group g on all partitions, $$CP_i^g = \sum_{p=0}^{P-1} CP_i^p \tag{10}$$

$CP_g$ the estimated CPU percentage of group g on all partitions, $$CP_g = \sum_{i=0}^{I-1} CP_i^g \tag{11}$$

The CPU index of the job is the total estimated CPU percentage of all groups, as follows:

$$Icpu = \sum_{g=0}^{G-1} CP_g \tag{12}$$

An algorithm to determine the CPU index of the job is as follows:

```
for each runable group g
    for each operator i inside g
        for each partition p among all partitions of operator i
            calculate CP_i^g using Eq. (10)
        calculate CP_g using Eq. (11)
    calculate Icpu using Eq. (12)
``` determine the CPU category based on the CPU index of the job as follows:
  If Icpu≥0.6, the job is a high CPU job.
  If 0.3≤Icpu≤0.6, the job is a medium CPU job.
  If 0≤Icpu≤0.3, the job is a low CPU job.

Figure 10:
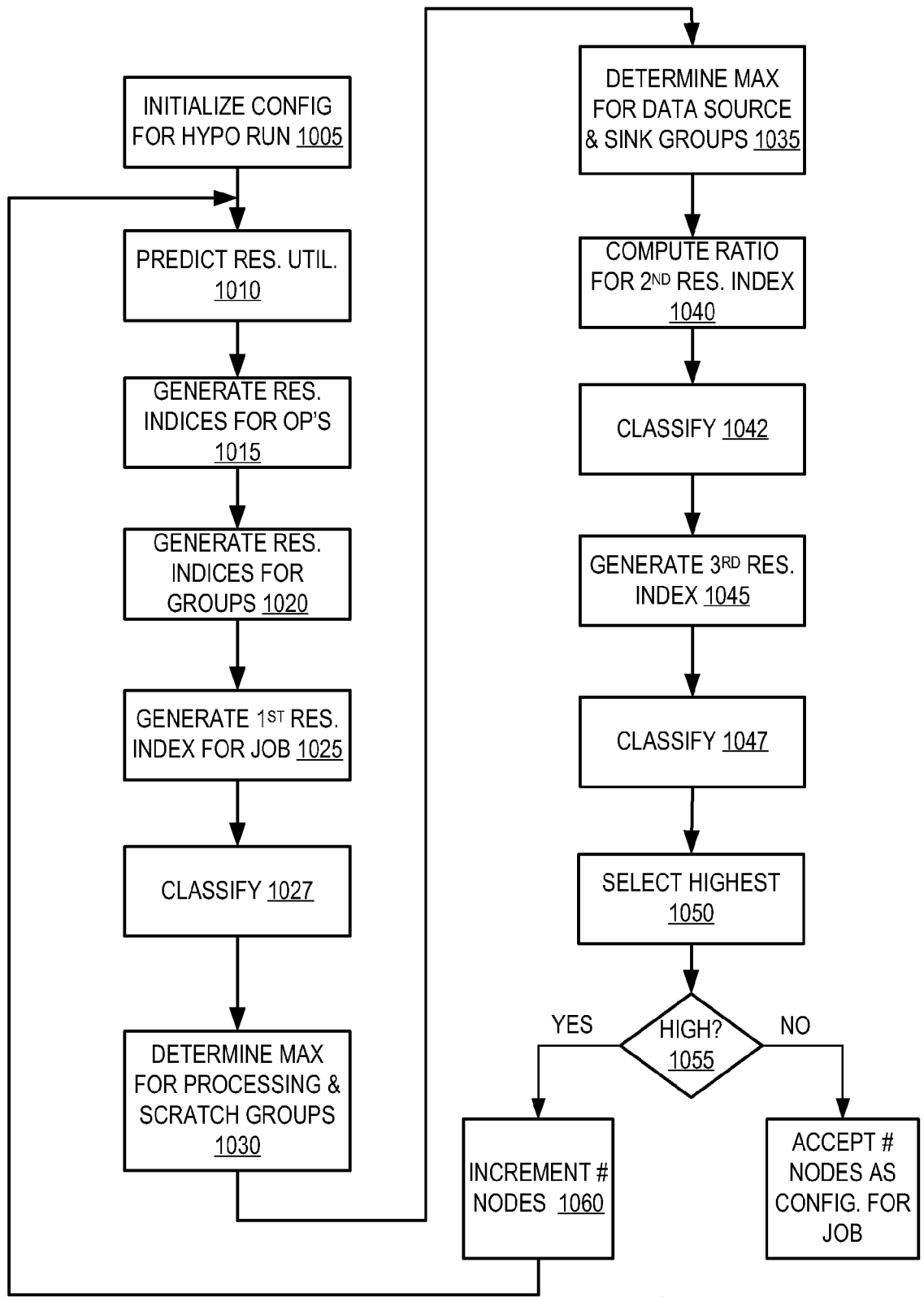
FIG. 10 depicts a flowchart of aspects of the resource optimization process of FIG. 9, according to an embodiment of the invention.

Referring now to FIG. 10, process 910 of FIG. 9 is illustrated for an embodiment of the present invention, according to what is described herein above. Process 910 includes initializing 1005 a hypothetical grid configuration having a number of physical nodes N, predicting 1010 grid resource utilizations using analytical model 740 for a hypothetical run on the hypothetical configuration, as described herein above. Next, process 910 generates 1015 resource utilization indices for the respective operators responsive to the predicted grid resource utilizations. Then process 910 generates 1020 resource utilization indices for respective groups of the operators responsive to the resource utilization indices of the respective operator groups. Then process 910 generates 1025 a first resource utilization index for the job responsive to the resource utilization indices of the respective operator groups. Process 910 then classifies 1027 the first resource utilization index in a high, medium or low CPU usage category.

Next, process 910 generates a second resource utilization index for the job, which includes selecting 1030 a first maximum of the resource utilization indices for a first subset of the operator groups, selecting 1035 a second maximum of the resource utilization indices for a second subset of the operator groups, and computing 1040 a ratio of the first and second maxima. The ratio is designates as the second resource utilization index. Process 910 then classifies 1042 the second resource utilization index in a high, medium or low CPU usage category.

Next process 910 generates 1045 a third resource utilization index for the job responsive to a sum of the predicted grid resource utilizations for all the operators. Process 910 then classifies 1047 the third resource utilization index in a high, medium or low CPU usage category, and then selects 1050 the highest category from among the first, second and third CPU usage categories.

Next, process 910 determines 1055 whether the selected resource utilization index is high. If yes, process 910 increments 1060 the number of hypothetical nodes, and returns to once again predict 1010 grid resource utilizations, etc. If no, process 910 accepts the current number of nodes.

Optimal Number of Partitions

The user can explicitly specify the number of logical partitions per physical compute node for a job. If so, the user-specified number of logical partitions is applied to the job. Otherwise, the analytic model automatically determines the optimal number of logical partitions based on estimated resource utilization, in accordance with one or more of the following embodiments of the invention.

In a first approach, if the user specifies the expected execution time for the job, the number of logical partitions that each operator runs on is determined based on the expected execution time. In a second approach, if the expected execution time is not user specified, the analytic model uses the estimated data throughput of each link to determine the number of logical partitions that each operator runs on. In this approach, the data throughput on either end of the link is adjusted so that the link has a unified data throughput which helps prevent a bottleneck. In a third approach, if each link in the job already has a unified data throughput, the CPU category is used to determine the number of logical partitions for the job, so all operators in the job have the same number of logical partitions.

Approach 1—User-Specified Expected Job Execution Time

The user specifies the expected time window for processing a given amount of data. The expected execution time of the job is shorter than the estimated execution time of the job. Parallel configuration needs to be changed so that the job can finish within the expected execution time. The number of logical partitions for each operator is determined based on the expected execution time of the job as follows:

Determine estimated execution time and CPU time for each operator on each partition based on the given input data size using the methodology from one of the incorporated applications.

Find the maximum estimated execution time of the data sink group. Use this as the estimated execution time of the job.

Calculate the ratio between the expected execution time of the job and the estimated execution time of the job:

$$r = E\tilde{T}/ET \tag{13}$$

where $E\tilde{T}$ represents the expected execution time of the job and $ET$ the estimated execution time of the job.

Start from the data source group, iterate through every group.

Apply Eq. (13) to each operator in each group to determine the expected execution time and expected CPU time for each operator on each partition:

$$E\tilde{T}_i^p = ET_i^p * r \tag{14}$$

$$C\tilde{T}_i^p = Icpu_i^p * E\tilde{T}_i^p \tag{15}$$

where $E\tilde{T}_i^p$ represents the expected execution time and $C\tilde{T}_i^p$ the expected CPU time for operator i on partition p.

Find the minimum expected CPU time of operator i among all partitions, $C\tilde{T}_{i,min}^p$, Calculate the total estimated CPU time of operator i on all partitions using Eq. (5)

Determine the optimal number of logical partitions using the following formula:

$$\tilde{P}_i = CT_i^g / C\tilde{T}_{i,min}^p \tag{16}$$

where $\tilde{P}_i$ represents the optimal number of logical partitions for operator i. If $\tilde{P}_i$ is not an integer, it is rounded up to the closest integer.

Approach 2—Unifying Data Throughput

In a data flow graph, a link connects two operators, referred to herein as "link mates." The operator on the upstream end of the link is called a producing operator, the operator on the downstream end of the link is called a consuming operator. The data throughput of the producing operator on this link is equal to the number of output records produced by the producing operator on this link divided by the estimated execution time of the producing operator. Similarly, the data throughput of the consuming operator on this link is equal to the number of input records consumed by the consuming operator on this link divided by the estimated execution time of the consuming operator.

Although the total number of records produced by the producing operator is the same as the total number of records consumed by its link mate, the consuming operator, the data throughputs of the link mates can be different because the estimated execution times of the operators can be different. A bottleneck may occur on this link if the data throughput of its consuming operator is less than the data throughput of its producing operator. The analytic model unifies the data throughput of the link by adjusting the number of logical partitions of the operator that has the smaller data throughput.

The number of logical partitions for each operator is determined based on the estimated data throughput as follows:

Determine estimated execution time and CPU time for each operator on each partition based on the given input data size using the methodology from one of the incorporated applications.

Determine expected execution time and CPU time for each operator on each partition using the following algorithm:

--- for each runable group g
    for each operator i inside g
        for each output link k of producing operator i
            find consuming operator j of link k
find the input port number h at which link k connects to consuming operator j determine expected execution time of consuming operator j on its input h $$E\tilde{T}_j^h = ET_i \tag{17}$$

where $E\tilde{T}_j^h$ represents the expected execution time of consuming operator j on its input h
for each runable group g
    for each operator i inside g
        determine the expected execution time of operator i based on $E\tilde{T}_i^h$ $$E\tilde{T}_{i,min}^p = \min\{E\tilde{T}_i^0, \ldots, E\tilde{T}_i^h, \ldots, E\tilde{T}_i^{H-1}\} \tag{18}$$

calculate minimum expected CPU time per partition based on CPU index $$C\tilde{T}_{i,min}^p = Icpu_i * E\tilde{T}_{i,min}^p \tag{19}$$

calculate the total estimated CPU time for all partitions using Eq. (5)
determine the optimal number of logical partitions using Eq. (16)

---

Data flow traverse can start from any group in both upstream and downstream directions following the algorithm given in step 2. When it starts from the data source group, data sink group, or one of scratch groups, data throughput is better balanced between I/O and processing operators which further improves the overall performance of the job.

Approach 3—CPU Category

If the estimated data throughput of each link is unified on both ends, the resource optimizer uses the CPU category in which the job is classified to determine the number of logical partitions for each operator.

If $Icpu_i \geq 0.8$, $\tilde{P}_i$ is set to the number of CPUs in the system.

If $0.4 \leq Icpu_i \leq 0.8$, $\tilde{P}_i$ is set to half of the number of CPUs in the system (rounded up or down to the next whole number, depending on the embodiment of the invention).

If $0 \leq Icpu_i \leq 0.4$, $\tilde{P}_i$ is set to 1.

Figure 11:
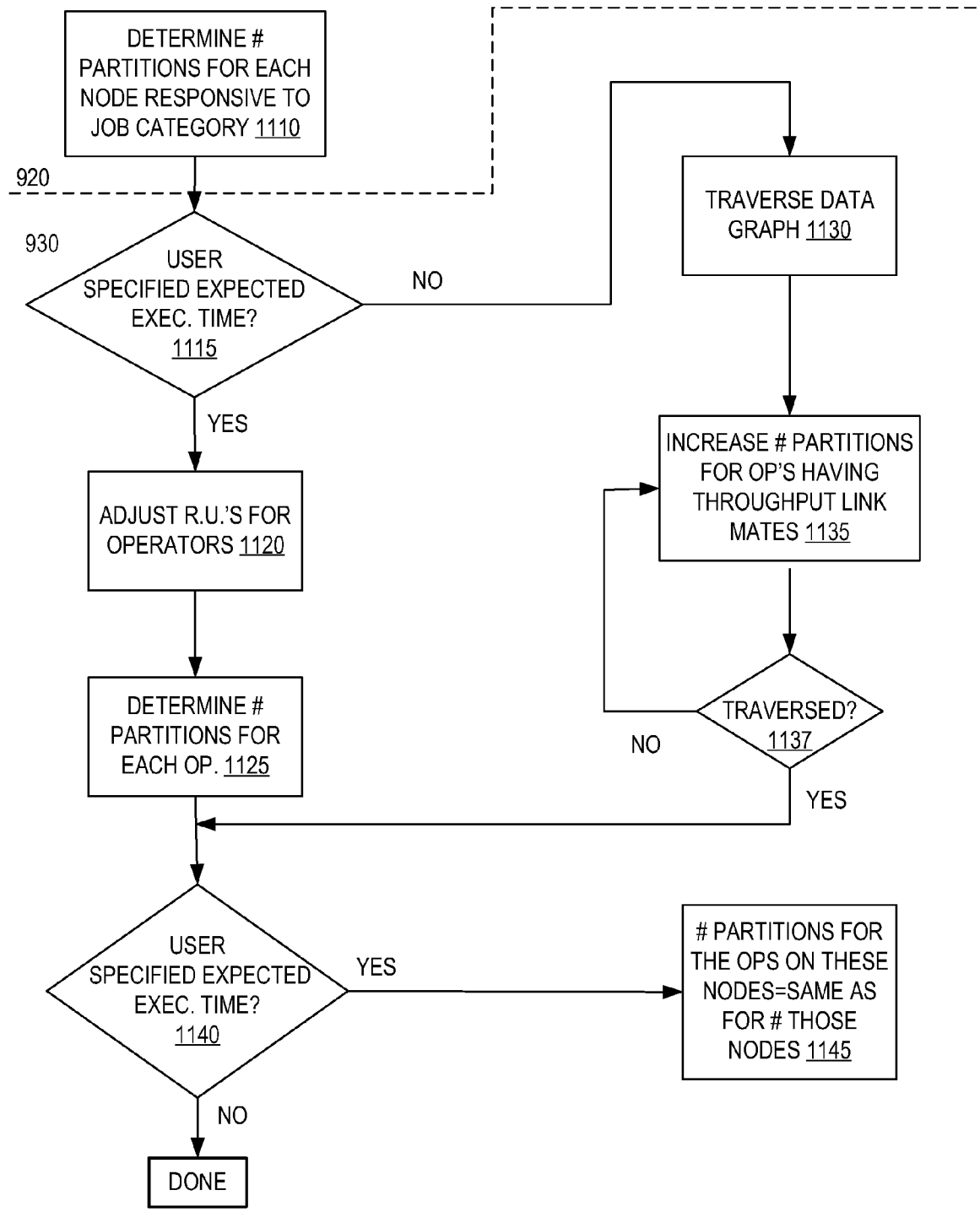
FIG. 11 depicts a flowchart of additional aspects the resource optimization process of FIG. 9, according to an embodiment of the invention.

Referring now to FIG. 11, processes 920 and 930 of FIG. 9 are illustrated for an embodiment of the present invention, according to what is described herein above. First, process 920 determines 1110 a number of partitions for each physical node responsive to the highest category selected (1050 FIG. 10) for the job. Next, process 930 determines 1115 whether a there is user-specified expected execution time. If yes, then process 930 adjusts 1120 estimated resource utilizations for operators responsive to a ratio of user-specified job execution time to estimated job execution time. Then, process 930 determines 1125 a number of partitions for each operator responsive to a combined total of adjusted estimated resource utilizations on all the operator's partitions and a minimum of the adjusted estimated resource utilizations among all the operator's partitions.

If process 930 determines 1115 no, then (given that the job request includes a data graph of linked operators specifying a sequence of parallel data integration operations performed when the parallel data integration job is run, such that each operator has one or more respective link mates) process 930 traverses 1130 the data graph and increases 1135 numbers of partitions for operators having throughputs less than their respective link mates.

Next, process 930 determines 1140 if the number of logical partitions is zero for any particular operator on any particular node. If yes, then process 930 designates 1145 for this operator on that particular node the number of logical partitions determined 920 for the job on that particular node.

System Resource Utilization

System resource utilization is collected by resource optimizer 430 in terms of the following attributes:

CPU percentage
memory
swap
number of running processes
disk space
scratch space

Resource optimizer 430 collects statistics on these system resources each time a job run request is submitted, and writes them to a system resource report. Job controller 420 compares the job resource requirements to the system resources that are available as indicated by the system resource report, and indicates in the job resource report whether or not the job has enough resources to run to complete.

Figure 8:
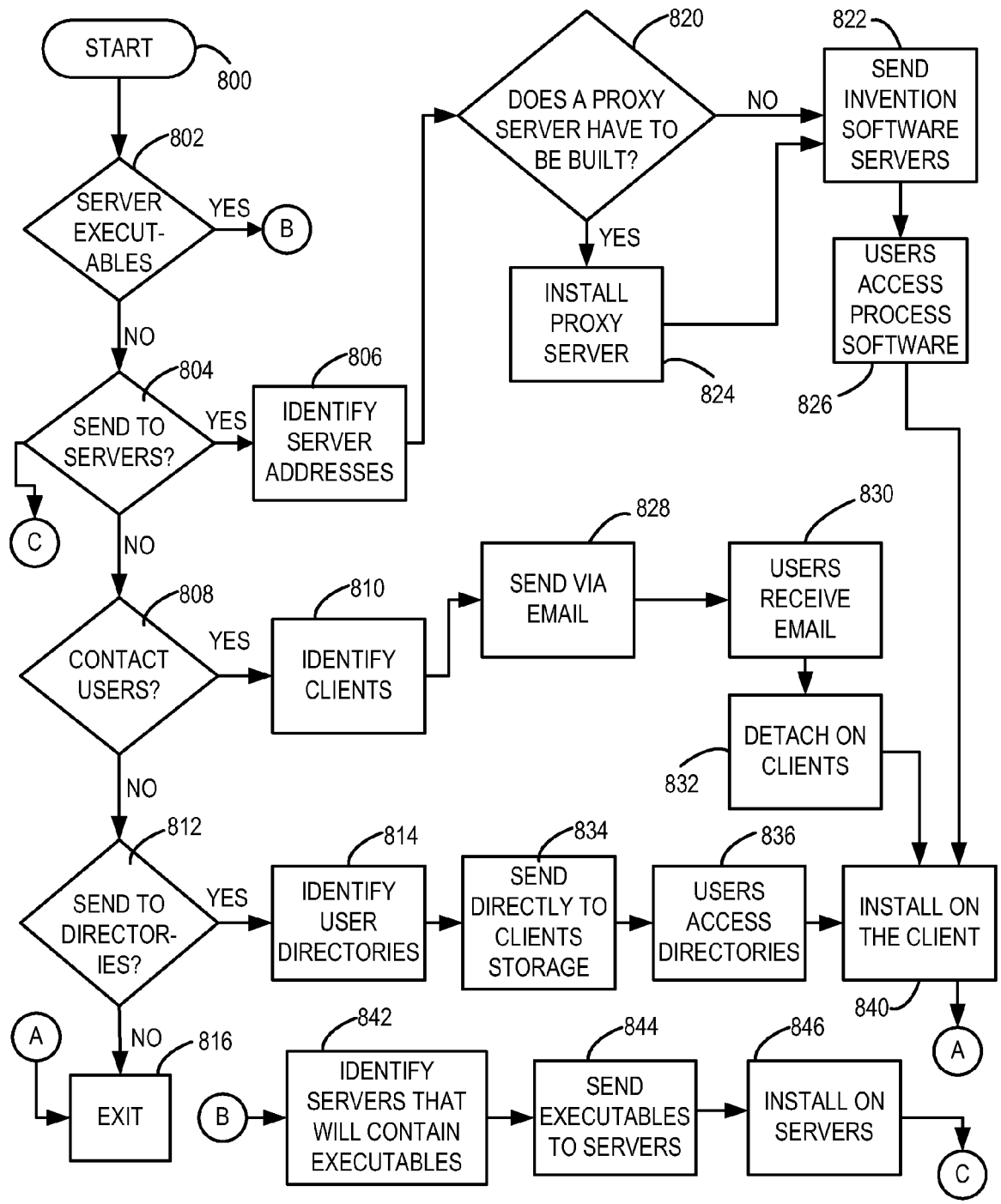
FIG. 8 depicts a flowchart of a representative process for software deployment used in an embodiment of the invention.

FIG. 8 depicts a flowchart of a deployment of a software process that includes an embodiment of the present invention. Step 800 begins the deployment software process. The first thing is to determine if there are any programs that will reside on a server or servers when the process software is executed 802. If this is the case then the servers that will contain the executables are identified 842. The process software for the server or servers is transferred directly to the servers' storage via FTP or some other protocol or by copying through the use of a shared file system 844. The software process is then installed on the servers 846.

Next, a determination is made on whether the software process is to be deployed by having users access the software process on a server or servers 804. If the users are to access the software process on servers then the server addresses that will store the invention are identified 806. A determination is made as to whether a proxy server is to be built 820 to store the software process. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 824.

The software process is sent to the servers either via a protocol such as FTP or it is copied directly from the source files to the server files via file sharing 822. Another embodiment would be to send a transaction to the servers that contained the software process and have the server process the transaction, then receive and copy the software process to the server's file system. Once the software process is stored at the servers, the users via their client computers, then access the software process on the servers and copy to their client computers file systems 826. Another embodiment is to have the servers automatically copy the process software to each client and then run the installation program for the process software at each client computer. The user executes the program that installs the software process on his client computer 840 then exits the process 816.

In step 808 a determination is made as to whether the software process is to be deployed by sending the software process to users via e-mail. The set of users where the software process will be deployed are identified together with the addresses of the user client computers 810. The process software is sent via e-mail to each of the users' client computers in step 528. The users then receive the e-mail 530 and then detach the process software from the e-mail to a directory on their client computers 832. The user executes the program that installs the process software on his client computer 840 then exits the process 816.

Lastly a determination is made on whether the process software will be sent directly to user directories on their client computers 812. If so, the user directories are identified 814. The process software is transferred directly to the user's client computer directory 834. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 836. The user executes the program that installs the process software on his client computer 840 then exits the process 816.

It should be appreciated from what has been described herein above that one or more embodiments of the invention automate the dynamic creation of configuration files for parallel data integration, which results in more nearly optimal job configurations. This, in turn, tends to improve execution and more closely match job configurations to job resource requirements. In one aspect, parallel configuration is responsive to dynamic factors including job characteristics (dataflow graph, metadata, and input data frequency distribution), input data volume, batch processing requirements, other concurrent running jobs, and the availability of system resources.

Regarding job category, jobs are placed into different groups based on CPU consumption: extremely high CPU, high CPU, medium CPU, and low CPU. Resource allocation is based on a group the job belongs to and resources the job actually needs. System resources are better managed in this way, as well, which prevents the system from being either overloaded or under-utilized. Job resource requirements are no longer merely part of a job run request. Job resource requirements are dynamically determined and optimized. This allows the user to focus on job design and not worry about defining resource requirements merely to run the job.

By adding resource optimization logic to job run mechanisms, job resource requirements are determined after a job is invoked but before the job is submitted to a resource manager in at least one embodiment of the present invention. This is in contrast to a job running immediately once it is invoked by the user either from the GUI or the command line. This is also in contrast to a job being submitted directly to a resource manager immediately upon being invoked. Mechanisms are provided to check on system resources before the job run request is executed to make sure that the system has enough resources to run the job, which avoids the job aborting due to lack of disk space, scratch space, or memory.

In an embodiment of the present invention, an automated process analyzes job run-time characteristics according to an analytic model that is based on performance data collected from previous job runs over time. This is in contrast to a static model that does not use any performance data and a dynamic model that uses segments of performance data from one job run. The analytic model is created prior to job run, or when the job is running. The user can also schedule to update the analytic model in a batch process. Collected performance data is stored in a repository along with job resource requirements and dynamic factors that produce performance data.

Benefits, advantages and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of optimizing resources for a parallel data integration job, the method comprising:
receiving a job request specifying a parallel data integration job to deploy in a grid wherein the job request includes operators specifying parallel integration operations performed when the parallel data integration job is run;
predicting grid resource utilizations for hypothetical runs of the specified job on respective hypothetical grid resource configurations responsive to a model based on performance data from a plurality of actual runs of previously deployed, parallel data jobs;
selecting a grid resource configuration for running the parallel data integration job, including automatically selecting a grid resource configuration responsive to the predicted grid resource utilizations and an optimization criterion based on at least one resource utilization index for the job; and generating the at least one resource utilization index for the job, comprising:

generate resource utilization indices for each respective operator responsive to the predicted grid resource utilizations on resource portions;

generating a respective operator index maximum for each respective operator;

generating, for each of a respective group of the operators, a respective maximum of the operator index maxima among the operators of the respective group;

selecting a first maximum of resource utilization indices for a first and second subset of data source and sink operator groups;

selecting a second maximum of resource utilization indices for a first and second subset of processing and scratch operator groups; and generating the at least one resource utilization index for the job responsive to a ratio of the first and second maxima.

2. The method of claim 1, comprising:

generating resource utilization categories, including automatically generating resource utilization categories responsive to the predicted grid resource utilizations, wherein automatically selecting the grid resource configuration responsive to the optimization criterion includes selecting the grid resource configuration responsive to the categories.

3. The method of claim 1, comprising:

generating a resource utilization index for the job responsive to a sum of the predicted grid resource utilizations for all the operators.

4. The method of claim 1, comprising:

generating correlation coefficients for the model responsive to performance data for a plurality of previous jobs actually run on respective configurations of the grid resources.

5. The method of claim 1, wherein selecting the grid resource configuration for running the parallel data integration job comprises:

selecting an optimal number of physical compute nodes.

6. The method of claim 1, wherein selecting the grid resource configuration for running the parallel data integration job comprises:

adjusting estimated resource utilizations for operators responsive to a ratio of user-specified job execution time to estimated job execution time; and selecting a number of partitions for each operator responsive to a combined total of adjusted estimated resource utilizations on all the operator's partitions and a minimum of the adjusted estimated resource utilizations among all the operator's partitions.

7. The method of claim 1, wherein the job request includes a data graph of linked operators specifying a sequence of parallel data integration operations performed when the parallel data integration job is run, such that each operator has one or more respective link mates, and wherein selecting the grid resource configuration for running the parallel data integration job comprises:

traversing the data graph and increasing numbers of partitions for operators having throughputs less than their respective link mates.

8. The method of claim 1, wherein selecting the grid resource configuration for running the parallel data integration job comprises:

selecting a number of partitions for each physical node responsive to the categories.

* * * * *